UNITED STATES PATENT OFFICE.

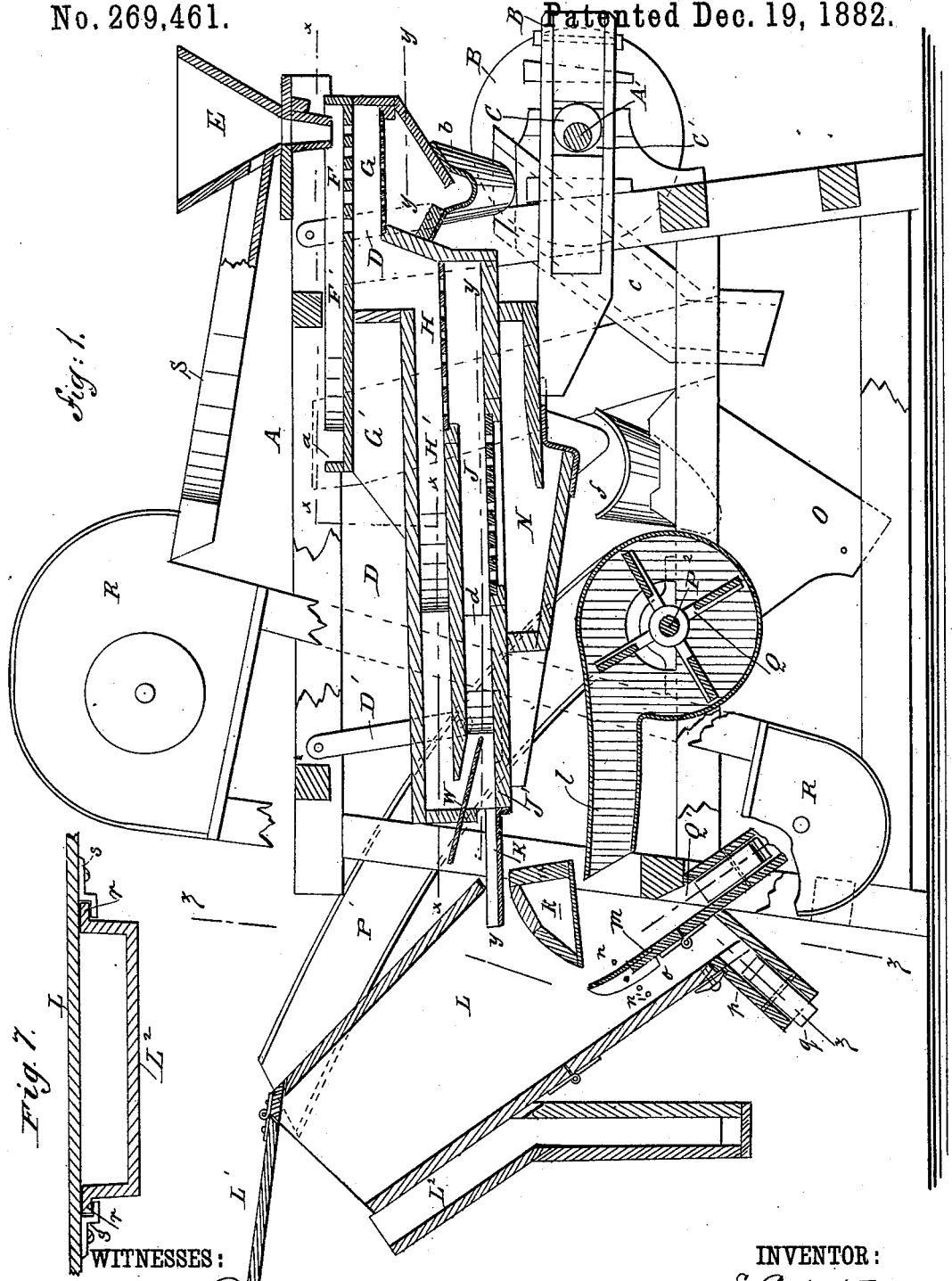

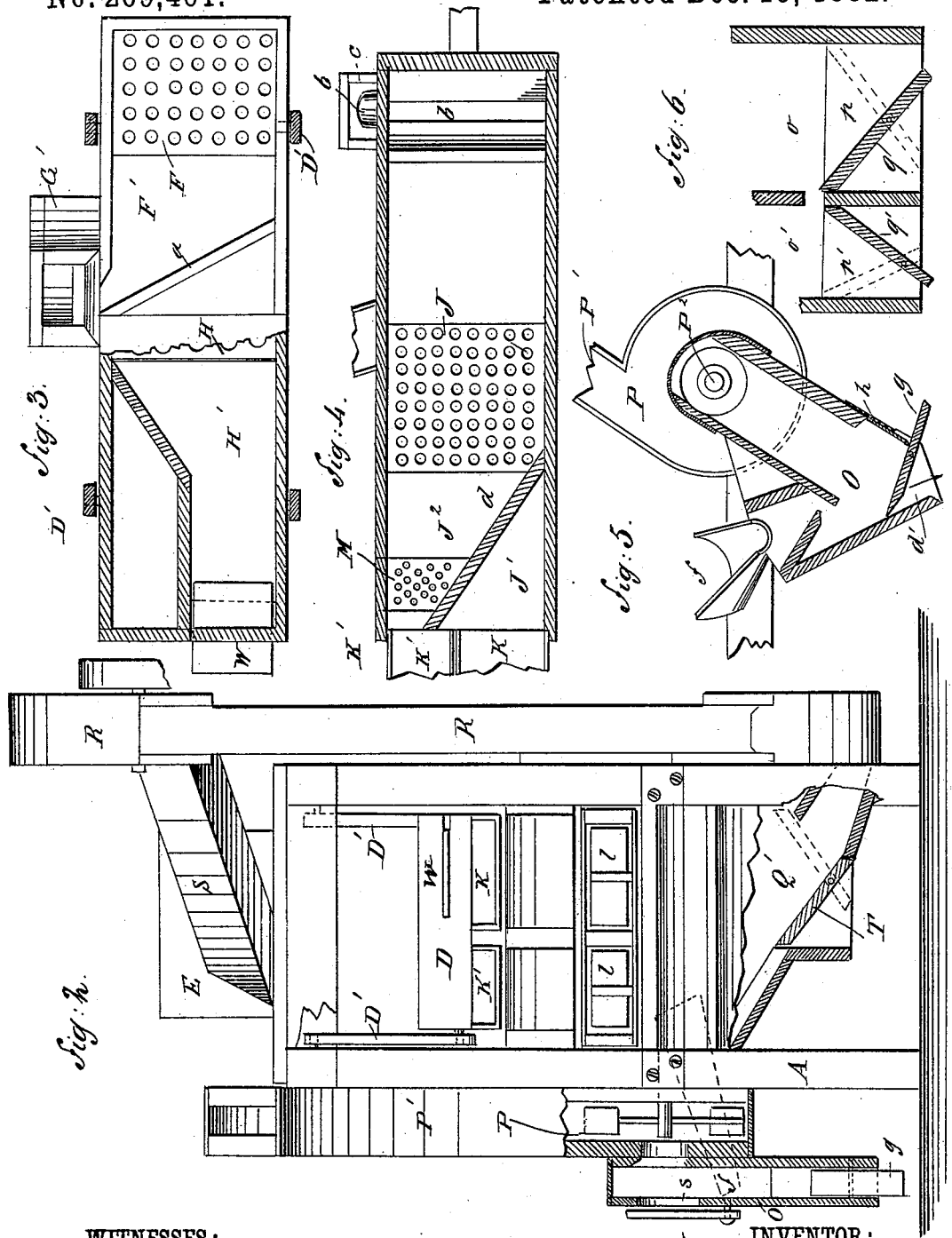

ELAM RAKESTRAW, OF CAMBRIDGEPORT, MASSACHUSETTS.

MACHINE FOR CLEANING AND GRADING COFFEE.

SPECIFICATION forming part of Letters Patent No. 269,461, dated December 19, 1882.

Application filed September 9, 1882. (No model.)

*To all whom it may concern:*

Be it known that I, ELAM RAKESTRAW, of Cambridgeport, in the county of Middlesex and State of Massachusetts, have invented a new and Improved Machine for Cleaning and Grading Coffee, of which the following is a full, clear, and exact description.

The object of my invention is to facilitate the separating of coffee into different grades, according to the size of the berries, and at the same time to free the coffee from sticks, stones, sand, and other impurities mixed with the same.

The invention consists in a reciprocating screen-shoe combined with a box with a curved surface, upon which the coffee drops from the screen-shoe, and in passing from the edge of the curved box is exposed to a powerful current of air, which blows the light coffee over swinging wings, from which it passes from suitable chutes into suitable receptacles, and the heavy coffee and stones drop upon the wings and slide down the same into a chute, and from the chute into an elevator, which raises them to a hopper, so that they pass through the screen-shoe a second time.

The invention consists, further, in certain other combinations and arrangements of parts, substantially as hereinafter more fully set forth and claimed.

Reference is to be had to the accompanying drawings, forming part of this specification, in which similar letters of reference indicate corresponding parts in all the figures.

Figure 1 is a longitudinal sectional elevation of my improved coffee cleaner and grader. Fig. 2 is a rear end elevation of the same, parts being broken out and others shown in section on the line $z\ z$, Fig. 1. Fig. 3 is a sectional plan view of the same on the line $x\ x$, Fig. 1. Fig. 4 is a sectional plan view of the same on the line $y\ y$, Fig. 1. Fig. 5 is a longitudinal sectional view of the blower. Fig. 6 is a longitudinal sectional elevation of the spout at the rear end of the machine. Fig. 7 is a cross-sectional view through spout $L^2$ and the bottom of the trunk L, showing the adjustability of said spout.

A frame, A, which supports all the parts of the machine, is provided at its front end with a transverse journaled shaft, A', having a driving-pulley, B, mounted at one end, and an eccentric disk, C, at the middle, the said eccentric disk C passing through a squared aperture, C', in an arm, B', projecting from the front end of a reciprocating shoe, D, which is suspended by means of pivoted hangers D' from the frame A and within the same, whereby, when the shaft A' is rotated, the shoe D will be reciprocated.

A hopper, E, is secured on the top of the frame A, at the front end of the same, and the bottom spout of the hopper conducts the materials passed into the hopper upon a screen, F, through which the coffee can pass upon a finer screen, G, below the screen F. The screen F is connected with a board, F', provided at the end toward the rear of the machine with a diagonal strip, $a$, placed edgewise across the board F', so as to conduct sticks, &c., remaining on the board to the upper end opening of a chute, G', which extends downward on the side of the frame A.

Below the screen G, I have provided an inclined chute, $b$, which conducts the sand, small stones, and like matter which has been separated from the coffee by the screen G into a chute, C, which is also secured to the side of the frame A, and has its lower end adjoining to the lower end of the chute G'. From the screen G the coffee drops upon a screen, H, and the fine coffee passes through upon a screen, J, below the screen H. The coffee that has not passed through the screen H passes upon a board, H', on a level with the same, and gradually moves along the said board and drops from the end of the same upon a board, J', on a level with the screen J, but separated from the same by a diagonal strip, $d$, placed edgewise. At the end of the board J' a chute or spout, K, is formed, which projects into a large trunk, L, secured on the rear of the frame A. The coffee that has passed through the screen H drops upon the screen J, and passes over the same and along a board, $J^2$, also on a level with the screen J, and separated from the board J' by the diagonal strip $d$, and from the board $J^2$ passes upon a spout, K', which also projects into the trunk L. If desired, an additional screen, M, may be placed in the board $J^2$, so that the coffee that comes from the screen J must also pass over the screen M. The screenings of the screen J pass into a box, N, below the screen J, and from the same pass through a chute, $f$, into a spout, O, connected with the suction-fan P, which spout O is provided with a series of opposite downwardly-inclined partitions, upon which the coffee drops, and then drops from one to the other, whereby it will be exposed to a current of air, and all light impurities will be removed and drawn off by the blower and blown through its spout P'. A valve, $g$, is pivoted in the bottom of the spout O, which, if opened, permits the coffee to pass through the box very rapidly in the direction of the arrow $d'$; but if the valve $g$ is closed, the coffee, accumulating on the said valve $g$, must press open a hinged gate or valve, $h$, which rests against the upper surface of the valve $g$. The coffee that passes from the spouts K and K' falls upon the inclined curved deflector frame or box $k$, held transversely below the outer ends of the said spouts.

Directly below the deflector-frame $k$, I have provided the ends of the spouts $l$ of a fan-blower, Q, on the same shaft P² with the suction-fan P. The coffee rolls over the rounded upper surface of the deflector-frame $k$, and the heavy coffee drops upon the hinged wing $m$, which can be adjusted by means of studs passed into the apertures $n$ in the sides of the trunk L, so that its free end will be a greater or less distance from the lower end of the deflector-frame $k$. The light coffee passes over the edges of the hinged wings $m$, and passes down the chutes $o$ $o'$ into the chutes $p$ and $p'$, which are provided with hinged gates or valves $q$ $q'$. The chutes $o$ $o'$ are formed by means of a partition subdividing the lower end of the trunk L in rear of the wing $m$ and its means of support into two compartments, as seen in Figs. 1 and 6. The chutes $p$ $p'$ consist of a short rearward and downward inclined chamber, subdivided by a central partition into two compartments, within which the valves $q$ $q'$ are disposed in oppositely-inclined positions, as seen in Figs. 1 and 6. The heavy coffee and stones slide down the chute Q' into the lower box of the elevator R, which contains an endless conveyer-belt for conveying the stones and coffee upward to a chute, S, which conducts them into the hopper E, so that they pass through the machine a second time.

It may happen that a great quantity of stones and a small quantity of coffee accumulate in the chute Q' before entering the lower box of the elevator R. I have provided a gate or valve, T, in the said chute Q', which gate can be opened to permit the accumulated stones to drop out of the chute Q'.

A slide, W, can be passed in between the ends of the boards H' and J', as shown in Fig. 1, for a purpose that will be described and set forth hereinafter.

The spout O is provided with an opening, $s$, which can be closed by a gate, V, and through the said opening the air is to be admitted to the blower. The light particles that are blown up through the trunk L strike the hinged cover L' of the same and drop into the adjustable chute L², attached to the rear of the trunk L. The spout L² is rendered adjustable, among other ways, by providing it with outward-projecting flanges $r$, resting and adapted to slide upon ways $s$, secured to and depending from the under side of the trunk L, as seen in Fig. 7.

The operation is as follows: Coffee is passed into the hopper E, and from the same drops upon the screen F, through which it passes upon the screen G. Sticks, leaves, &c., cannot pass through the meshes of the screen F, but pass over the board F' to the chute G'. The coffee that has passed the screen G passes from the same upon the screen H. The sand and other fine impurities, passing through the meshes of the screen G upon the chute $b$ and through the same, are conducted to the chute C, through which they pass off. The coarse coffee and stones remain upon the screen H, and the finer coffee, &c., drops through the meshes of the screen H upon the meshes of the screen J. The coffee that remains on the screen H passes from there upon the board H' and over the same to the chute K. The fine coffee upon the screen J passes upon the board J² and over the additional screen M upon the chute K', so that the fine coffee will pass out through the chute K' and the coarse coffee through the chute K. It frequently happens that the coarse coffee moves much more rapidly than the fine coffee, and to avoid this a diagonal slide, W, is pushed in between the boards H' and J' more or less to retard the progress of the coarse coffee. The fine and broken particles of coffee that pass through the screen J drop upon the chutes N and $f$ and are conducted into the spout O, in which they are exposed to a current of air, which carries off the light impurities. The coffee is then collected in a vessel placed below the bottom opening of the spout O. By means of a hinged gate, $g$, the coffee can be exposed to the current of air a greater or less time. As stated above, the light coffee drops into the chutes $o$ and $o'$, and from the same into the chutes $p$ and $p'$, and is then collected in separate receptacles placed below the said chutes, if the gates $q$ and $q'$ are adjusted as shown in Fig. 6. If the gates are adjusted as shown in dotted lines in Fig. 6, the fine and coarse coffee will be mixed as they issue from the chutes $p$ and $p'$. The heavy particles of coffee, stones, &c., pass through the chute Q' into the lower box of the elevator R, and are carried upward by the same into a chute, S, which conveys it back into the hopper E. As the coffee passes from the edge of the box $k$, it is subjected to a current of air issuing through the trunk L of a powerful blower, Q. The current of air carries off all the light particles and carries them up through the trunk L until they strike the hinged cover L'. The heavier particles will fall back through the chute L², and the light particles and the chaff will be carried off from the machine.

The chute L² must be adjusted higher or lower, according to the inclination of the cover L', so that the heavy particles, &c., that strike and are thrown back by the cover L' will pass into the chute L², light chaff, &c., passing off with the current of air.

Having thus fully described my invention, I claim as new and desire to secure by Letters Patent—

1. In a coffee cleaner and grader, the combination, with the reciprocating screen-shoe D, of the box k, having a curved top, the trunk L, the hinged wings m, the chute Q', the chutes o and o', the hinged cover L', the adjustable chute L², and the blower Q, substantially as herein shown and described, and for the purpose set forth.

2. In a coffee cleaner and grader, the combination, with the reciprocating screen-shoe D, of the box k, having a curved top, the trunk L, the hinged wings m, the chute Q', the chutes o and o', the chutes p and p', provided with the hinged gates q and q', and the blower Q, substantially as herein shown and described, and for the purpose set forth.

3. In a coffee cleaner and grader, the combination, with the reciprocating screen-shoe D, of the chutes N and f, the spout O, the suction-fan P, and the swinging gates g and h in the spout O, substantially as herein shown and described, and for the purpose set forth.

4. In a coffee cleaner and grader, the combination, with the reciprocating screen-shoe D, of the trunk L, the box k, the hinged wings m, the chutes o and o' and p and p', the chute Q', and the gate T in the lower end of the chute Q', substantially as herein shown and described, and for the purpose set forth.

ELAM RAKESTRAW.

Witnesses:
JOHN C. MASON,
J. H. DWINELL.